United States Patent Office 3,483,187
Patented Dec. 9, 1969

3,483,187
**CERTAIN N₁₁-SUBSTITUTED PYRIDOBENZO-
DIAZEPINE DERIVATIVES**
Karl J. Doebel, Ossining, and Heinz A. Pfenninger,
Dobbs Ferry, N.Y., assignors to Geigy Chemical
Corporation, Greenburgh, N.Y., a corporation of
Delaware
No Drawing. Filed June 23, 1965, Ser. No. 466,443
The portion of the term of the patent subsequent to
June 6, 1984, has been disclaimed
Int. Cl. C07d *53/06;* A61k *27/00*
U.S. Cl. 260—239.3          9 Claims

ABSTRACT OF THE DISCLOSURE

The compounds are of the class of N₁₁-substituted pyridobenzodiazepine derivatives useful as analgesic, tranquilizing and/or local anesthetic agents. An illustrative embodiment is 11 - benzyl-8-chloro-1,2,3,11,12,12a-hexahydro(4H,6H)pyrido[2,1 - c] - [1,4]benzodiazepine - 12- one.

DETAILED DISCLOSURE

This invention relates to new and useful pyridobenzodiazepine and particularly to N₁₁-substituted pyridobenzodiazepine derivatives as well as the pharmaceutically acceptable acid addition salts, quaternary ammonium salts and N-oxides thereof, which possess valuable pharmacological properties and are useful as pharmaceutical agents. The present invention pertains further to methods for producing such derivatives.

The instant invention concerns, more particularly, 11-substituted - 1,2,3,11,12,12a - hexahydro(4H,6H)pyrido-[2,1-c]-[1,4]-benzodiazepine-12-ones which can be represented by the following structural formula

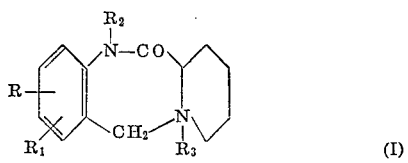

(I)

wherein
R and R₁ each stand for hydrogen, halogen (particularly, chlorine, bromine or iodine), trifluoromethyl, lower alkyl, lower alkoxy or methylenedioxy when R and R₁ are taken together and are attached to adjacent carbon atoms on the benzene ring;
R₂ is lower alkyl, lower alkenyl, di(lower)alkylamino-(lower)alkyl, or phenyl(lower)alkyl.
R₃ is a pair of electrons, oxygen or lower alkyl.

The term "alkyl" as used herein means saturated monovalent aliphatic groups of the general formula —C$_m$H$_{2m+1}$ wherein $m$ designates an integer of 1 to 10 and is inclusive of both straight-chain and branched-chain radicals, such as, methyl, ethyl, n-propyl, isopropyl, n-butyl, isobutyl, n-amyl, n-heptyl, n-octyl, isooctyl, nonyl, decyl, etc. The term "lower alkyl" as used herein per se and as included in the term "lower alkoxy" means saturated monovalent aliphatic radicals of the general formula —C$_n$H$_{2n+1}$ wherein $n$ designates an integer of 1 to 10 and is inclusive of both straight-chain and branched-chain radicals, such as, methyl, ethyl, n-propyl, isopropyl, n-butyl, isobutyl, n-amyl, n-heptyl, n-octyl, isooctyl, nonyl, decyl, etc. The term "lower alkyl" as used herein per se and as included in the term "lower alkoxy" means saturated monovalent aliphatic radicals of the general formula —C$_n$H$_{2n+1}$ wherein $n$ designates an integer of less than six and is inclusive of both straight-chain and branched-chain radicals, such as, methyl, ethyl, n-propyl, isopropyl, n-butyl, isobutyl, n-amyl, etc. The term "alkenyl" as used herein means ethylenically unsaturated monovalent aliphatic groups having 3 to 6 carbon atoms, such as allyl, methallyl, butenyl, etc. The term "cycloalkyl" as used herein means cyclic saturated monovalent aliphatic groups having 3 to 7 carbon atoms, such as, cyclobutyl, cyclopentyl, cyclohexyl and cycloheptyl.

11 - substituted - 1,2,3,11,12,12a - hexahydro(4H,6H)-pyrido[2,1 - c] - [1,4]benzodiazepine - 12 - ones are produced by first reacting compounds of Formula II

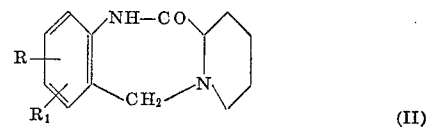

(II)

wherein R and R₁ are as defined hereinabove, with (1) alkali metal alkoxides, such as sodium or potassium methoxides, ethoxides, propoxides or n- or tert. butoxides—with sodium methoxide and potassium tert. butoxide being preferred—in dimethylsulfoxide; or
(2) alkali metal hydrides, such as, lithium, sodium or potassium hydride—with sodium hydride being preferred—in ether solvents exemplified by tetrahydrofurane, dioxane, diethylene glycol dimethyl ether, etc., or
(3) alkali metal amides, as for example, lithium, sodium or potassium amide—with sodium amide being preferred—in inert organic solvents, as for instance, benzene, toluene, xylene, etc.; or
(4) alkyl or aryl lithium, such as, preferably lower alkyl lithium and more preferably butyl lithium, or phenyl lithium, in inert organic solvents, such as, benzene, toluene, xylene, hexene, etc.

The resulting reaction product, the anion of the compounds of Formula II, is then treated with a compound of the formula R₂Hal or (R₂)₂SO₄ wherein R₂ is a defined hereinabove and Hal stands for halogen, particularly, chlorine or bromine, to obtain the above-mentioned 11-substituted pyridobenzodiazepines of this invention.

It is to be noted, however, that 11-hydroxy-alkyl substitued pyridobenzodiazepines of this invention are preferably prepared by reduction of 11-carbonyl-alkyl substituted or 11-carbo(lower)alkoxy-alkyl substituted pyridobenzodiazepines.

Compounds of Formula II are prepared by reacting lower alkylpipecolinates and appropriately substituted o-nitrobenzylhalides in such inert solvents as benzene, toluene, xylene, etc. in the presence of an excess of an acid binding agent, such as potassium carbonate, sodium carbonate, etc. The o-nitrobenzylpipecolinates thus obtained can be conveniently reduced with hydrogen in the presence of Raney-nickel at atmospheric pressure and room temperature to yield the corresponding o-aminobenzylpipecolinates as intermediates. To prevent debenzylation in the hydrogenation step the hydrogenation must be stopped exactly after consumption of the theoretical amount of hydrogen. The intermediate o- aminobenzylpipecolinates can be saponified and simultaneously condensed to the desired pyridobenzodiazepine ring system by treating them with mineral acids such as hydrohalic (hydrochloric or hydrobromic) or sulfuric acids.

The overall synthesis of the novel 11-substituted pyridobenzodiazepines of this invention may be graphically illustrated by the following equations:

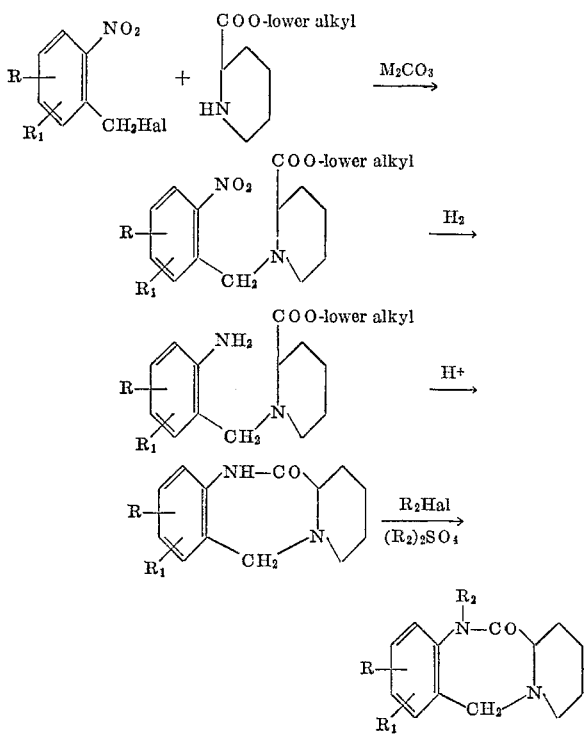

The symbols R, $R_1$, $R_2$ and Hal have the significance ascribed to them hereinabove and M stands for K or Na.

An alternative pathway starts from substituted o-aminobenzyl alcohols which are then converted to their halides, condensed with lower alkyl pipecolinates and subsequently cyclized all in accordance with the following equations:

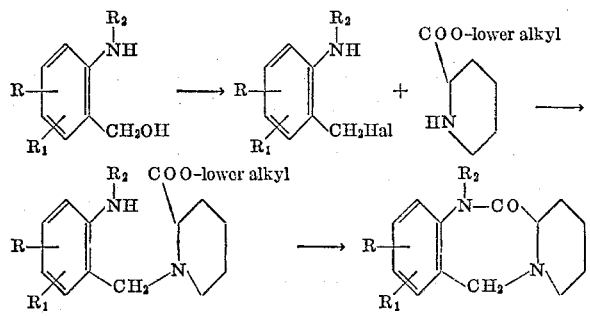

This alternative synthesis is preferably carried out with concomitant protection of the secondary amino group.

The 11-substituted pyridobenzodiazepines of this invention are racemates since they contain an asymmetric carbon-atom ($C_{12a}$). They can be resolved by well-known methods into their d- and l-forms. Toxicity tests with respect to the dl-, d- and l-forms have shown that the d-form is less toxic and thus pharmacologically more valuable.

The 11-substituted pyridobenzodiazepines of this invention can also be converted to their N-oxides (Position 5). This is achieved by reacting these 11-substituted pyridobenzodiazepines with hydrogen peroxide in glacial acetic acid or by treating them with peracids, such as, peracetic acid, perbenzoic acid, perphthalic acid, m-chlorperbenzoic acid and the like. The N-oxides obtained are stereoisomeric mixtures consisting of two racemates which in turn can be resolved into their respective optically active forms in accordance with conventional resolution methods.

The present invention comprehends not only the above described pyridobenzodiazepine derivatives in their free base form, but it also includes pharmaceutically acceptable non-toxic acid addition salts thereof which can be formed from said derivatives in accordance with conventional practice, by using appropriate inorganic and organic acids, such as hydrohalic acids, especially hydrochloric and hydrobromic acids, sulfuric and phosphoric acids, etc. as well as acetic, lactic, succinic, malic, aconitic, phthalic and tartaric acids, etc.

The quaternary ammonium salts of the subject compounds can be obtained by addition to the corresponding free bases of alkyl or aralkyl esters of inorganic acids or organic sulfonic acids, including such compounds as methyl chloride, methyl bromide, methyl iodide, ethyl bromide, propyl bromide, benzyl chloride, benzyl bromide, methyl sulfate, methyl benzenesulfonate, and methyl p-toluenesulfonate, giving the methochloride, methobromide, benzobromide, methosulfate, methobenzenesulfonate, and metho-p-toluene sulfonate salts, respectively.

As mentioned above, the subject compounds possess valuable pharmacological properties; they can be characterized as analgesic, tranquilizing and/or local anesthetic agents on the basis of pharmacological evaluation in animals according to standard test procedures.

Merely by way of illustration:

8-chloro - 11 - methyl-1,2,3,11,12,12a-hexahydro(4H, 6H)pyrido[2,1-c]-[1,4]benzodiazepine-12-one is strongly active as an analgesic as measured in the Acetic Acid Stretch Test, Haffner-Test and Tail-Flick Test. It is also very active as measured by the increase of gut motility. Furthermore, this compound shows significant local anesthetic action.

11 - ally - 8 - chloro - 1,2,3,11,12,12a - hexahydro(4H, 6H) - pyrido[2,1 - c] - [1,4]benzodiazepine - 12-one exhibits considerable transquilizing activity as measured by the Sidman-avoidance test in Gerbils.

11 - butyl - 8 - chloro-1,2,3,11,12,12a-hexahydro(4H, 6H) - pyrido[2,1 - c] - [1,4]benzodiazepine - 12-one maleate displays tranquilizing activity at 160 mg./kg. i.p. in Gerbils as measured by the Sidman-avoidance test.

8 - chloro - 11 - isopropyl - 1,2,3,11,12,12a - hexahydro(4H, 6H) - pyrido[2,1 - c] - [1,4]benzodiazepine - 12 - one maleate has significant analgesic activity as measured by the Tail-Flick Test in mice and potent transquilizing activity as assayed by the Sidman-avoidance test in Gerbils.

11 - benzyl -8 - chloro - 1,2,3,11,12,12a - hexahydro(4H,6H) - pyride[2,1 - c] - [1,4]benzodiazepine-12-one hydrochloride has potent transquilizing activity and neuroleptic action as determined by the Sidman-avoidance test in Gerbils.

The compounds of this invention may be administered orally or parenterally in conventional dosage forms such as tablets, capsules, injectables or the like by incorporating the appropriate dose of the compound with carriers according to accepted pharmaceutical practice.

The compounds of this invention and their acid addition salts as well as the various intermediates therefor, together with the over-all synthesis as well as the preparative steps, are more fully illustrated in experimental detail by the following examples. The scope of the invention is, however, not limited thereto. The temperatures therein given are in degrees centigrade.

In these examples the following nomenclature is used:

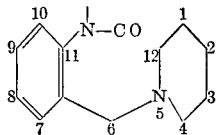

11 - substituted - 1,2,3,11,12,12a - hexadydro(4H,6H) pyrido-[2,1-c]-[1,4]benzodiazephine-12-one.

EXAMPLES (I) Intermediate 1,2,3,11,12,12a - hexahydro(4,6H) pyrido[2,1-c]-[1,4]benzodiazepine-12-ones Example 1.—1,2,3,11,12,12a-hexahydro(4H,6H)pyrido-[2,1-c]-[1,4]benzodiazepine-12-one (a) Ethyl pipecolinate.—200 g. of pipecolinic acid was dissolved in 1625 ml. of 5 N hydrochloric acid. 8 g. of $PtO_2$ was added and the mixture was transferred to a 5 l. pressure flask and heated to 70°. This temperature was maintained and electronically controlled during the whole operation. The solution was shaken with hydrogen at a pressure of 5 atm. The total uptake was 340 p.s.i. (3 hours). The flask was cooled to room-temperature, hydrogen was replaced by nitrogen and the catalyst removed by filtration. Completeness of hydrogenation was controlled by U.V. Measurments. The solution was then concentrated to dryness in vacuo and the crystalline pipecolinic acid hydrochloride dried by azeotropic distillation of benzene. 265 g. of pipecolinic acid hydrochloride were obtained; M.P. 265–266°. 100 g. pipecolinic acid hydrochloride was dissolved in 1050 ml. of dry ethanol and 25 ml. of chlorosulfonic acid was added dropwise. The mixture was refluxed for 24 hours and the solvent removed in vacuo. The residue was dissolved in a small amount of water and the solution made alkaline with saturated potassium carbonate solution at 0°. The alkaline solution was saturated with sodium chloride and exhaustively extracted with benzene and ether. The combined extracts were dried over sodium sulfate, filtered and the solvent removed in vacuo. The residue was distilled to yield 80.0 g. of the desired intermediate; B.P. 93–95°/14 mm.; $n_D^{24}=1.4550$. Only end-absorption in the U.V. spectrum was observed.

(b) Ethyl N-(o-nitrobenzyl)pipecolinate.—31.4 g. of ethyl pipecolinate was dissolved in 200 ml. of dry toluene. 32.0 g. of potassium carbonate was added and a solution of 34.3 g. of o-nitrobenzylchloride in 150 ml. of dry toluene was slowly dropped in while stirring. After the addition was complete, the mixture was refluxed for 12 hours. After cooling it was transferred to a beaker and an excess of 3 N hydrochloric acid was added. When the potassium carbonate was decomposed both phases were transferred to a separatory funnel and the toluene phase was extracted with 3 N hydrochloric acid. The combined extracts were washed with ethyl acetate and alkalized with sodium hydroxide to pH 10. The precipitated oily material was taken up in chloroform and the latter washed with water, dried over sodium sulfate and the solvent removed in vacuo. The residue was distilled to give 43 g. of the desired intermediate as a yellow oil; B.P. 150–152°/0.35 mm.; $n_D^{23}=1.5266$.

Analysis.—Calc'd for $C_{15}H_{20}N_2O_4$ (MW 292.35); C, 61.65; H, 6.89; N, 9.57. Found: C, 61.75; H, 7.08; N, 9.33.

(c) Ethyl N - (o-aminobenzyl)pipecolinate.—33.0 g. of ethyl N-(o-nitrobenzyl)pipecolinate was dissolved in 500 ml. of ethanol and hydrogenated over Raney-nickel at room temperature and atmospheric pressure. Uptake of hydrogen was 2350 ml. The catalyst was removed by filtration and the solvent removed in vacuo. The residue was distilled to yield 24.7 g. of the desired intermediate; B.P. 146–147°/0.5 mm.; $n_D^{23}=1.5392$.

(d) Desired intermediate.—24 g. of ethyl N-(o-aminobenzyl)pipecolinate was dissolved in 300 ml. of hydrochloric acid and refluxed for 5 hours. The resulting yellow solution was cooled, filtered and alkalized to a pH of 10. The crystalline precipitate was collected on a Buchner-funnel, washed with water and recrystallized from 2B-ethanol. Yield of the desired compound was 70%; M.P. 182–183°.

Analysis.—Calc'd for $C_{13}H_{16}N_2O$ (MW 216.29): C, 72.2; H, 7.46; N, 12.92. Found: C, 72.13; H, 7.66; N, 12.83.

The hydrochloride was obtained in crystalline form by treating the free base with excess ethanolic hydrochloric acid, removing the solvent in vacuo and recrystallizing the residue from ether/ethanol or 5 N hydrochloric acid. It melted at about 250°.

Example 2.—8 - chloro-1,2,3,11,12,12a-hexahydro(4H,-6H)pyrido[2,1-c]-[1,4]benzodiazepine-12-one (a) Ethyl N - (2-nitro-5-chlorobenzyl)pipecolinate.—33.3 g. of ethyl pipecolinate was dissolved in 200 ml. of dry toluene, 34 g. of potassium carbonate was added and a solution of 44.54 g. of 2-nitro-5-chlorobenzylchloride [synthesized via the procedure described by Eichengrün and Einhorn, A. 262, 133 (1891) and Fieser and Berliner, JACS 74, 536 (1952)] in 300 ml. of dry toluene dropped in while stirring. After the addition was complete the mixture was refluxed for 12 hours. After cooling the mixture was acidified and exhaustively extracted with 3 N hydrochloric acid. The combined acid extracts were washed with ethyl acetate and then made strongly alkaline. The precipitated oil was extracted with ether, the later washed with water, dried over sodium sulfate and removed in vacuo. The residue was distilled in vacuo to yield 45.8 g. (66% theory) of the desired intermediate as a yellow viscous oil; B.P. 153–154°/0.1 mm.

Analysis.—Calc'd for $C_{15}H_{19}ClN_2O_4$ (MW 326.79): C, 55.20; H, 5.86; Cl, 10.84; N, 8.58. Found: C, 55.20; H, 6.00; Cl, 11.03; N, 8.59.

(b) Ethyl N - (2-amino-5-chlorobenzyl)pipecolinate.—7.5 g. of ethyl N - (2-nitro-5-chlorobenzyl)pipecolinate was dissolved in 100 ml. of ethanol and hydrogenated at room temperature and atmospheric pressure over Raney-nickel. Uptake of hydrogen was 1670 ml. The catalyst was then removed by filtration and the filtrate evaporated to dryness in vacuo. The residual oil was distilled to yield 5.1 g. of the desired intermediate as oil; B.P. 154°/0.3 mm.

Analysis.—Calc'd for $C_{15}H_{21}ClN_2O_2$ (MW 296.80): C, 60.80; H, 7.12; Cl, 11.93; N, 9.45. Found: C, 60.53; H, 7.27; Cl, 11.89; N, 9.62.

(c) Desired intermediate.—20.0 g. of ethyl N - (2-amino-5-chlorobenzyl)pipecolinate was refluxed with 350 ml. of 3 N hydrochloric acid for 5 hours. After cooling the solution was alkalized to pH 10 and then extracted exhaustively with chloroform. The combined chloroform extracts were washed with water, dried over sodium sulfate and the solvent removed in vacuo. The residue weighed 16.32 g. and was a white crystalline solid. It could be easily recrystallized from 2B ethanol. Yield of the desired compound was 14 g.; M.P. 224–225°.

Analysis.—Calc'd for $C_{13}H_{15}ClN_2O$ (MW 250.72): C, 62.35; H, 6.03; Cl, 14.13; N, 11.17. Found: C, 62.08; H, 6.29; Cl, 14.30; N, 11.21.

The following compounds were made by way of an analogous procedure:

9 - cyano - 1,2,3,11,12,12a - hexahydro(4H,6H)pyrido-[2,1-c]-[1,4]benzodiazepine-12-one; M.P. 134°.

9 - methoxy - 1,2,3,11,12,12a - hexahydro(4H,6H)pyrido-[2,1-c]-[1,4]benzodiazepine-12-one; M.P. 205–207°.

9 - methyl - 1,2,3,11,12,12a - hexahydro(4H,6H)pyrido-[2,1-c]-[1,4]benzodiazepine-12-one; M.P. 231–232°.

9 - trifluoromethyl - 1,2,3,11,12,12a - hexahydro(4H,-6H)pyrido[2,1-c] - [1,4]benzodiazepine-12-one; M.P. 185–186°.

9-chloro-1,2,3,11,12,12a-hexahydro(4H,6H)pyrido-[2,1-c]-[1,4]benzodiazepine-12-one; M.P. 182–183°.

Example 3.—8,9-dimethoxy-1,2,3,11,12,12a-hexahydro(4H,6H)pyrido[2,1-c]-[1,4]benzodiazepine-12-one (a) 6-nitroveratryl alcohol.—To a solution of 21.1 g. of 6-nitroveratraldehyde (Org. Synth. 33, 65) in 150 ml. of benzene was added at room temperature with stirring a solution of 3.36 g. of t-butylamine borane in 300 ml. of benzene. The obtained mixture was refluxed for one-half hour, then cooled to room temperature and stirred for one-half hour with 75 ml. of 2 N sulfuric acid. The solid precipitate was then filtered off. The benzene layer separated from the filtrate, dried over sodium sulfate and taken to dryness and the so obtained residue combined with the already filtered off precipitate. Yield (crude): 16 g. (75%). The desired product was recrystallized twice from ethanol; M.P. 145–146°.

(b) 6-nitroveratryl chloride.—10.65 g. of 6-nitroveratryl alcohol was dissolved in 300 ml. of chloroform and 15 g. of phosphorous pentachloride was added with stirring at room temperature. The reaction mixture was allowed to stand overnight at room temperature, then it was washed with water, sodium bicarbonate solution and the chloroform solution was dried over sodium sulfate and taken to dryness. The remaining oil crystallized and was recrystallized from ethanol. Yield: 10.5 g. (91%); M.P. 90–91°.

(c) Ethyl N-(3,4-dimethoxy-6-nitrobenzyl)pipecolinate.—To a mixture of 8.3 g. of ethyl pipecolinate and 36 g. of anhydrous potassium carbonate in 300 ml. of anhydrous toluene was added dropwise with stirring at the refluxing temperature a solution of 12.7 g. of 6-nitroveratryl chloride in 200 ml. of toluene. The obtained reaction mixture was refluxed for 8 hours with continuous stirring. After cooling to room temperature, the inorganic precipitate was filtered off and washed with ethyl acetate. The combined organic filtrates were extracted with 2 N hydrochloric acid, the aqueous extract was washed with ethyl acetate, made alkaline with solid potassium carbonate at 0° and extracted with ethyl acetate. The organic extracts were dried over sodium sulfate and taken to dryness. The residual oil crystallized on scratching and was recrystallized from ethanol-water. Yield: 5.8 g. (46%); M.P. 68–69°.

(d) Ethyl N-(3,4-dimethoxy-6-aminobenzyl)pipecolinate.—17.7 g. of ethyl N-(3,4-dimethoxy-6-nitrobenzyl)pipecolinate was dissolved in 500 ml. of ethanol and hydrogenated with Raney-nickel at room temperature and atmospheric hydrogen pressure until the hydrogen uptake stopped. The reaction mixture was filtered and taken to dryness and the remaining oil used directly for the next step. Yield: 16.25 g. (99.5%).

(e) Desired intermediate.—16.25 g. of ethyl N-(3,4-dimethoxy-6-aminobenzyl)pipecolinate was refluxed with a mixture of 170 ml. of 5 N sodium hydroxide and 170 ml. of ethanol for 16 hours. The ethanol was then evaporated under reduced pressure, the residue diluted with water until a clean solution resulted and then made acidic with dilute sulfuric acid (1:1). The obtained solution was allowed to stand at room temperature for 24 hours, then it was treated with charcoal, filtered, made alkaline with solid potassium carbonate and extracted thoroughly with methylene chloride. The combined organic extracts were dried over sodium sulfate and taken to dryness. The yield of crude material was 3 g. (21.6%). It was recrystallized twice from ethanol; M.P. 203–204°.

*Analysis.*—Calc'd for $C_{15}H_{20}N_2O_3$ (MW 276.33): C, 65.19; H, 7.30; N, 10.14. Found: C, 65.47; H, 7.34; N, 10.20.

The following compounds were made by way of an analogous procedure:

8,9-dimethyl-1,2,3,11,12,12a-hexahydro(4H,6H)pyrido-[2,1-c]-[1,4]benzodiazepine-12-one; M.P. 229–230°.

8,9-dichloro-1,2,3,11,12,12a-hexahydro(4H,6H)-pyrido-[2,1-c]-[1,4]benzodiazepine-12-one; M.P. 199–200°.

8,9-methylenedioxy-1,2,3,11,12,12a-hexahydro(4H,6H)-pyrido[2,1-c]-[1,4]benzodiazepine-12-one; M.P. 265–266°.

(II) Desired 11-substituted-1,2,3,11,12,12a-hexahydro-(4H,6H)pyrido[2,1-c]-[1,4]-benzodiazepine-12-ones Example 4.—8-chloro-11-methyl-1,2,3,11,12,12a-hexahydro(4H,6H)pyrido[2,1-c]-[1,4]benzodiazepine-12-one 6.27 g. of 8-chloro-1,2,3,11,12,12a-hexahydro(4H,6H)-pyrido[2,1-c]-[1,4]benzodiazepine-12-one was suspended in 50 ml. of anhydrous dimethylsulfoxide, 1.5 g. of sodium methoxide was added and the mixture stirred at room temperature for 30 minutes. To the obtained solution, 5.3 g. of methyl iodide was added at once and the mixture stirred for one hour. The reaction mixture was then poured, with stirring, into 500 ml. of cold water, the obtained aqueous suspension made alkaline with 2 N sodium hydroxide solution and allowed to stand overnight in the ice-box. The crystalline precipitate was filtered off, dried and recrystallized from hexane. M.P. 107–108°. Yield: 3 g. (45.5%).

*Analysis.*—Calc'd for $C_{14}H_{17}ClN_2O$: C, 63.50; H, 6.47; Cl, 13.39. Found: C, 63.57; H, 6.51; Cl, 13.43.

Modifications of the above-described process:

(a) 10 g. of 8-chloro-1,2,3,11,12,12a-hexahydro(4H,6H)-pyrido[2,1-c]-[1,4]benzodiazepine-12-one and 4.5 g. potassium tert. butoxide were stirred together in 80 ml. anhydrous DMSO until a clear solution resulted. Then, 2.5 g. of dimethylsulfate was added at once and the reaction stirred for 20 hours. The reaction mixture was poured onto ice-water and the precipitated gum extracted with chloroform. The organic extract was washed with water, dried over sodium sulfate, filtered, and the solvent removed under reduced pressure. The partially solid residue was extracted with boiling hexane and the hexane solution was concentrated to a small volume. Crystallization could be induced and the desired product was filtered off and recrystallized from hexane. Yield: 4.2 g.; M.P. 107–108°.

(b) 50 g. of 8-chloro-1,2,3,11,12,12a-hexahydro(4H,6H)pyrido[2,1-c]-[1,4]benzodiazepine-12-one and 22.4 g. of potassium tert. butoxide were stirred together in 250 ml. of anhydrous DMSO until a clear solution resulted. Then, 31 g. methyl iodide was added at once and the reaction stirred for 20 hours. The reaction mixture was poured into ice-water and the precipitated gum extracted with chloroform. The organic extract was washed with water, dried over sodium sulfate, filtered and the solvent removed under reduced pressure. The residue was extracted with boiling hexane. The hexane solution was evaporated to dryness and the residue recrystallized from hexane. Yield: 30 g.; M.P. 107–108°.

Example 5.—8-chloro-11-methyl-1,2,3,11,12,12a-hexahydro(4H,6H)-pyrido[2,1-c]-[1,4]benzodiazepine-12-one-5-oxide 5 g. of 8-chloro-11-methyl-1,2,3,11,12,12a-hexahydro(4H,6H)pyrido[2,1-c]-[1,4]benzodiazepine-12-one and 9 g. of m-chloroperbenzoic acid were dissolved in 50 ml. of chloroform and the obtained solution was refluxed for 4 hours. The cooled reaction mixture was washed with saturated sodium carbonate solution and water, dried over sodium sulfate, filtered and the filtrate was evaporated to dryness under reduced pressure. The solid residue was recrystallized twice from acetone with charcoal treatment. Obtained was a white crystalline solid (1.5 g.). M.P. 197–198° (dec.).

*Analysis.*—Calc'd for $C_{14}H_{17}ClN_2O$: C, 56.27; H, 6.41; N, 9.38; Cl, 11.87. Found: C, 56.40; H, 6.36; N, 9.53; Cl, 11.79.

From the mother liquids of the recrystallizations, the other isomer could be isolated.

Example 6.—8-chloro-5,11 - dimethyl - 1,2,3,11,12,12a-hexahydro(4H,6H)-pyrido[2,1-c]-[1,4]benzodiazepine-12-one iodide 5 g. of 8-chloro-11-methtyl-1,2,3,11,12,12a-hexahydro-(4H,6H)pyrido[2,1 - c]-[1,4]benzodiazepine-12-one was dissolved at room temperature in 25 ml. of methyl iodide. After 15 hours, the excess methyl iodide was evaporated under reduced pressure and the residue was washed with acetone. 3.8 g. of a white, crystalline solid was obtained. It was recrystallized from water with charcoal treatment to the melting point of 283–284° (dec.).

*Analysis.*—Calc'd for $C_{15}H_{20}ClIN_2O$: C, 44.29; H, 4.90; N, 6.89; I, 31.20. Found: C, 44.36; H, 4.81; N, 7.17; I, 31.22.

Example 7.—(+) - 8 - chloro-11-methyl-1,2,3,11,12,12a-hexahydro(4H,6H)pyrido[2,1 - c] - [1,4]benzodiazepine-12-one 16.1 g. (±) - 8-chloro-11-methyl-1,2,3,11,12,12a-hexahydro(4H,6H)pyrido[2,1 - c] - [1,4]benzodiazepine-12-one and 22.9 g. of dibenzoyl-l-tartaric acid were dissolved in 700 ml. of hot isopropanol. Water was added to the point of turbidity and the mixture allowed to remain at 5° for 2 days. The precipitated salt was filtered off, suspended in ethanol to remove some oily material, filtered again and recrystallized from isopropanol. Yield: 2.1 g.; M.P. 154–155°; (d):$[\alpha]_D^{25°}=+292°$ (c.=1.665; DMSO; 10 cm.).

Another 2.9 g. of the salt could be obtained from the mother liquid.

The salt (5.0 g.) was decomposed with 1 N sodium hydroxide and the free base extracted with chloroform. The organic solution was dried over sodium sulfate, filtered and the solvent removed under reduced pressure. The remaining oil was crystallized and recrystallized from hexane. Yield 0.72 g. M.P. 109–110°. $[\alpha]_D^{27°}=+385°$ (c.=1.8; EtOH; 10 cm.).

*Analysis.*—Calc'd for $C_{14}H_{17}ClN_2O$: C, 63.60; H, 6.47. Found: C, 63.25; H, 6.56.

Example 8.—(−) - 8 - chloro-11-methyl-1,2,3,11,12,12a-hexahydro(4H,6H)pyrido[2,1 - c] - [1,4]benzodiazepine-12-one 24.9 g. of racemic 8-chloro-11-methyl-1,2,3,11,12,12a-hexahydro(4H,6H)pyrido[2,1 - c] - [1,4]benzodiazepine-12-one was transformed into the dibenzoyltartrate with 33.5 g. of dibenzoyl-d-tartaric acid ($[\alpha]_D^{24°}=-69.8°$ [c.=1.81; EtOH; 10 cm.]) in 150 ml. of anhydrous ethanol. The ethanol was then removed and the residue dissolved in a boiling ethanol-water mixture (about 1000 ml. water and 500 ml. ethanol). Upon standing, a partially crystalline product separated. The supernatant liquid was decanted and the gummy residue washed with hot ethanol and filtered. 12.8 g. of salt was obtained; M.P. 170° (dec.).

The salt was recrystallized from isopropanol. M.P. 181–182°; $[\alpha]_D^{25°}=-225°$ (c.=1.185; DMSO; 10 cm.).

It was decomposed with 1 N sodium hydroxide solution and extracted with chloroform. The organic extract was dried over sodium sulfate and the solvent removed under reduced pressure. The residual oil was crystallized and recrystallized from hexane. Yield of pure material 1.8 g. (14.5%); M.P. of 110–111°; $[\alpha]_D^{25°}=-368°$ (c.=216; EtOH; 10 cm.).

*Analysis.*—Calc'd for $C_{14}H_{17}ClN_2O$: C, 63.50; H, 6.47; N, 10.58; Cl, 13.39. Found: C, 63.34; H, 6.46; N, 10.73; Cl, 13.35.

Example 9.—8 - chloro - 11-ethyl-1,2,3,11,12,12a-hexahydro(4H,6H)pyrido[2,1-c]-[1,4]benzodiazepine-12-one 25.1 g. of 8-chloro-1,2,3,11,12,12a-hexahydro(4H,6H)-pyrido[2,1-c]-[1,4]benzodiazepine-12-one and 5.4 g. of sodium methoxide was added to 500 ml. of dimethylsulfoxide (anhydrous) and the mixture stirred at 50° for 30 minutes. To the obtained solution was added slowly at the same temperature 15.6 g. of ethyl iodide and the reaction mixture was heated for an additional 5 hours.

The cooled reaction mixture was poured into about 1000 ml. ice-water and the mixture made alkaline with potassium carbonate. The aqueous layer was decanted from the precipitated gum and the latter dissolved in chloroform, washed with water, treated with charcoal, filtered and concentrated under reduced pressure.

The obtained oil was distilled under reduced pressure; B.P. 152–154°/0.015 mm. Hg. Yield: 18 g. (64.5%). The obtained yellow oil could be crystallized and recrystallized from hexane: M.P. 58–59°.

*Analysis.*—Calc'd for $C_{15}H_{19}ClN_2O$: C, 64.63; H, 6.87; N, 10.05; Cl, 12.72. Found: C, 64.91; H, 7.15; N, 10.05; Cl, 12.58.

Example 10.—11 Allyl-8-chloro-1,2,3,11,12,12a-hexahydro(4H,6H)pyrido[2,1 - c]-[1,4]benzodiazepine-12-one hydrochloride 5.0 g. of 8-chloro-1,2,3,11,12,12a-hexahydro(4H,6H) pyrido[2,1-c]-[1,4]benzodiazepine-12-one and 1.2 g. of sodium methoxide were dissolved in 60 ml. of anhydrous dimethylsulfoxide. To this solution a mixture of 2.42 g. of allyl bromide and 20 ml. of dimethylsulfoxide was added and the mixture stirred for 18 hours. The reaction mixture was poured into 500 ml. ice-cold water and the precipitated product extracted with ethyl acetate. The organic solution was extracted with 2 N hydrochloric acid, the aqueous solution obtained was made alkaline with solid potassium carbonate at 0° and the precipitated product extracted with ethyl acetate. The organic layer was washed with saturated sodium chloride solution dried over sodium sulfate, filtered and the solvent was removed under reduced pressure. 5.5 g. of a yellowish, viscous oil was obtained. It was dissolved in a small amount of ethanolic hydrochloric acid, the solvent and the excess acid removed under reduced pressure, the residue taken up in a small amount of anhydrous ethanol and diluted with ether. The hydrochloride crystallized out upon standing over night at 20° C. Yield 5.1 g. (72%). The compound was further purified by sublimation at 160°/0.001 mm. Hg and another recrystallization from ethanol-ether M.P. 214° (dec.).

*Analysis.*—Calc'd for $C_{16}H_{20}Cl_2N_2O$: C, 58.71; H, 6.16; N, 8.56; Cl, 21.67. Found: C, 58.53; H, 6.16; N, 8.98; Cl, 21.61.

Example 11.—8-chloro - 11 - isopropyl-1,2,3,11,12,12a-hexahydro(4H,6H)pyrido[2,1 - c] - [1,4]benzodiazepine-12-one maleate 25.0 g. of 8-chloro-1,2,3,11,12,12a-hexahydro(4H,6H)-pyrido[2,1-c]-[1,4]benzodiazepine-12-one and 5.97 g. of sodium methoxide were suspended in 100 ml. of DMSO (anhydrous). This mixture was heated up to 100° with stirring and kept at this temperature for 30 minutes. To the obtained clear solution was added dropwise at 100° a solution of 18.3 g. isopropyl bromide in 50 ml. of DMSO (anhydrous). The reaction was then kept at 100° for 15 hours.

The cooled mixture was poured onto 500 ml. ice-water and made alkaline with solid potassium carbonate. The aqueous layer was decanted and the residual gum dissolved in chloroform, heated with charcoal, dried over sodium sulfate, filtered and the solvent was removed under reduced pressure.

The residual oil was dissolved in 2 N hydrochloric acid, treated cold with charcoal, filtered, the filtrate was made alkaline again and the base extracted with chloroform. Removal of the solvent left a viscous oil that was distilled under reduced pressure. B.P. 150–155°/0.065 mm. Hg; Yield: 8.85 g. (35.6%).

6.4 g. of the free base was converted to the maleate with 2.54 g. of maleic acid in ethanol. The solvent was removed and the residual glass crystallized and recrystallized from isopropanol. Yield: 4.0 g. (44.7%); M.P. 157–158°.

*Analysis.*—Calc'd for $C_{20}H_{25}ClN_2O_5$: C, 58.74; H, 6.61; N, 6.85; Cl, 8.67. Found: C, 59.02; H, 6.00; N, 6.77; Cl, 8.61.

Example 12.—11 - butyl-8-chloro-1,2,3,11,12,12a-hexahydro(4H,6H)pyrido[2,1-c] - [1,4]benzodiazepine - 12-one maleate 25.0 g. of 8 - chloro - 1,2,3,11,12,12a-hexahydro(4H,6H)pyrido[2,1-c] - [1,4]benzodiazepine-12-one was suspended in 100 ml. of anhydrous DMSO and 6.0 g. of sodium methoxide was added. This mixture was heated up to 100° and stirred at this temperature for 30 minutes.

Then a solution of 20.4 g. of bromobutane in 50 ml. of anhydrous DMSO was added dropwise and heating and stirring continued for six hours. The cooled reaction mixture was poured into ice-water. A gummy substance precipitated. The aqueous phase was decanted and extracted with chloroform. The gummy compound was dissolved in chloroform and the organic layers were combined, dried over sodium sulfate, treated with charcoal, filtered and the solvent was removed under reduced pressure. The obtained oil was distilled under reduced pressure: Yield of a nearly colorless oil: 22.85 g. (75%); B.P. 154–157°/ 0.1 mm.

9.5 g. of the free base could be converted into the maleate with 3.97 g. of maleic acid in ethanol. The ethanol was removed under reduced pressure and the residue crystallized and recrystallized from isopropanol. Yield: 4.8 g. (11.5%); M.P. 137–138°.

*Analysis.*—Calc'd for $C_{21}H_{27}ClN_2O_5$: C, 59.64; H, 6.44; Cl, 8.39; N, 6.63. Found: C, 59.59; H, 6.53; Cl, 8.40; N, 6.41.

Example 13.—11 - benzyl-8-chloro-1,2,3,11,12,12a-hexahydro(4H,6H)pyrido[2,1-c] - [1,4]benzodiazepine-12-one hydrochloride 25 g. of 8-chloro-1,2,3,11,12,12a-hexahydro(4H,6H)-pyrido[2,1-c]-[1,4]benzodiazepine-12-one and 6 g. of sodium methoxide were stirred together in 100 ml. of anhydrous DMSO at 100° until a clear solution resulted (30 min.). Then a solution of 18.9 g. of benzylchloride in 50 ml. of anhydrous DMSO was added dropwise at 100° with stirring and the resulting mixture was heated for another 5 hours.

The cooled reaction mixture was poured into about 500 ml. of ice-water, the precipitated gum extracted with chloroform and the organic extract washed with water, treated with charcoal, filtered and dried over sodium sulfate. The solvent was removed under reduced pressure and the residual oil distilled. B.P. 180°/0.008 mm. Hg. The obtained oil was transformed into the hydrochloride with ethanolic hydrochloric acid. Yield 30.65 g. (81%). It was recrystallized from ethanol M.P. 200–202° (dec.).

*Analysis.* — Calc'd for $C_{20}H_{22}Cl_2N_2O$: C, 63.66; H, 5.88; N, 7.18; Cl, 18.79. Found: C, 63.48; H, 5.90; N, 7.43; Cl, 18.66.

Example 14.—8-chloro-11-(N,N-dimethylaminopropyl)-1,2,3,11,12,12a - hexahydro(4H,6H)pyrido[2,1 - c]-[1,4]benzodiazepine-12-one dimaleate 5.0 g. of 8-chloro-1,2,3,11,12,12a-hexahydro(4H,6H) pyrido[2,1-c]-[1,4]benzodiazepine-12-one was suspended in 150 ml. of anhydrous dioxane, 1.0 g. of 50% sodium hydride suspension in oil was added and the mixture refluxed for one hour until no more hydrogen evolved. Then a solution of 2.7 g. of N,N-dimethylaminopropylchloride in 50 ml. of anhydrous dioxane was added dropwise over 30 minutes with stirring and refluxing. Heating was continued for 14 hours and the cooled reaction mixture diluted with water, most of the liquid evaporated under reduced pressure and the residue distributed between ethyl acetate and water. The organic extract was extracted with 2 N hydrochloric acid, the aqueous solution treated with charcoal, filtered and made alkaline with solid potassium carbonate at 0°. The free base was extracted with ethyl acetate, the organic layer dried over sodium sulfate and the solvent removed under reduced pressure. Yield: 5.5 g. oil.

This free, oily base was dissolved in benzene and chromatographed on alumina (Column: $\phi$: 2.5 cm.; Height 14 cm.; $Al_2O_3$ Woelm, act. I, basic). The first 600 ml. of benzene eluated 4.05 g. of heavy oil, which was distilled under high vacuum in an air bath. B.P. 190°/0.003 mm.

2.1 g. of the free base was converted with 1.62 g. of maleic acid in ethanol as solvent into the dimaleate. The ethanol was removed under reduced pressure and the residual oil crystallized and recrystallized from isopropanol. Yield: 2.5 g. (27.7%); M.P. 136–137°.

*Analysis.*—Calc'd for $C_{26}H_{34}ClN_3O_9$: C, 54.98; H, 6.03; N, 7.40; Cl, 6.24. Found: C, 54.94; H, 6.21; N, 7.20; Cl, 6.08.

What is claimed is:
1. A compound of the formula

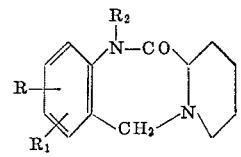

wherein
each of R and $R_1$ is hydrogen, halogen, trifluoromethyl, lower alkyl, lower alkoxy or methylenedioxy; and
$R_2$ is lower alkyl, lower alkenyl, di(lower)alkylamino (lower)alkyl, or phenyl(lower)alkyl;
or a pharmaceutically acceptable acid addition salt thereof.

2. A compound of the formula

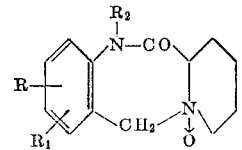

wherein
each of R and $R_1$ is hydrogen, halogen, trifluoromethyl, lower alkyl, lower alkoxy or methylenedioxy; and
$R_2$ is lower alkyl, lower alkenyl, di(lower)alkylamino (lower)alkyl or phenyl(lower)alkyl.

3. A compound of the formula

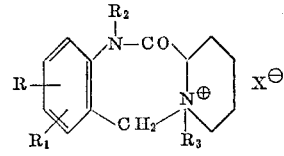

wherein
each of R and $R_1$ is hydrogen, halogen, trifluoromethyl, lower alkyl, lower alkoxy or methylenedioxy;
$R_2$ is lower alkyl, lower alkenyl, di(lower)alkylamino (lower)alkyl or phenyl(lower)alkyl;
$R_3$ is lower alkyl, and
$X^{\ominus}$ is a pharmaceutically acceptable anion.

4. 8 - chloro - 11 - methyl - 1,2,3,11,12,12a - hexahydro(4H,6H)-pyrido[2,1-c]-[1,4]benzodiazepine-12-one.

5. 11 - allyl - 8 - chloro - 1,2,3,11,12,12a - hexahydro(4H,6H)-pyrido[2,1-c]-[1,4]benzodiazepine-12-one.

6. 8 - chloro - 11 - isopropyl - 1,2,3,11,12,12a - hexahydro(4H,6H)-pyrido[2,1-c]-[1,4]benzodiazepine-12-one.

7. 11-benzyl-8-chloro-1,2,3,11,12,12a-hexahydro(4H,6H)-pyrido[2,1-c]-[1,4]benzodiazepine-12-one.
8. (−)-8-chloro-11-methyl-1,2,3,11,12,12a-hexahydro(4H,6H)-pyrido[2,1-c]-[1,4]benzodiazepine-12-one.
9. (+)-8-chloro-11-methyl-1,2,3,11,12,12a-hexahydro(4H,6H)-pyrido[2,1-c]-[1,4]benzodiazepine-12-one.

References Cited

UNITED STATES PATENTS

| 3,324,116 | 6/1967 | Doebel et al. | 260—239.3 |
| 3,150,125 | 9/1964 | Schnutz | 260 |
| 3,270,053 | 8/1966 | Reeder | 260—239.3 |
| 3,300,504 | 1/1967 | Doebel | 260—239.3 |

HENRY R. JILES, Primary Examiner

R. T. BORD, Assistant Examiner

U.S. Cl. X.R.

260—294.3; 424—244, 267